United States Patent
Gou et al.

(10) Patent No.: US 12,464,521 B2
(45) Date of Patent: Nov. 4, 2025

(54) DETERMINING A CARRIER FOR A CONTROL CHANNEL TRANSMISSION

(71) Applicant: ZTE Corporation, Guangdong (CN)

(72) Inventors: Wei Gou, Guangdong (CN); Peng Hao, Guangdong (CN); Junfeng Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 335 days.

(21) Appl. No.: 18/132,338

(22) Filed: Apr. 7, 2023

(65) Prior Publication Data

US 2023/0247632 A1  Aug. 3, 2023

Related U.S. Application Data

(63) Continuation of application No. PCT/CN2020/121022, filed on Oct. 15, 2020.

(51) Int. Cl.
H04W 72/1273 (2023.01)
H04L 1/1812 (2023.01)
H04W 72/23 (2023.01)

(52) U.S. Cl.
CPC ....... *H04W 72/1273* (2013.01); *H04L 1/1812* (2013.01); *H04W 72/23* (2023.01)

(58) Field of Classification Search
CPC .. H04W 72/1273; H04W 72/23; H04L 1/1812
See application file for complete search history.

(56) References Cited

U.S. PATENT DOCUMENTS

| | | | |
|---|---|---|---|
| 2010/0195586 A1 | 8/2010 | Choi et al. | |
| 2011/0064042 A1 | 3/2011 | Kim et al. | |
| 2012/0069795 A1 | 3/2012 | Chung et al. | |
| 2012/0224557 A1 | 9/2012 | Noh et al. | |
| 2015/0245347 A1 | 8/2015 | Yi et al. | |
| 2019/0222361 A1 | 7/2019 | Cheng et al. | |
| 2019/0312682 A1* | 10/2019 | Nammi | H04W 72/12 |
| 2020/0022175 A1 | 1/2020 | Xiong et al. | |
| 2020/0153556 A1* | 5/2020 | Nammi | H04L 1/0026 |

(Continued)

FOREIGN PATENT DOCUMENTS

| | | |
|---|---|---|
| CN | 102742195 A | 10/2012 |
| CN | 102811495 A | 12/2012 |
| CN | 103874215 A | 6/2014 |

OTHER PUBLICATIONS

European Search Report issued in EP Patent Application No. 20957083.7, dated Sep. 7, 2023, 12 pages.

(Continued)

*Primary Examiner* — Brian J. Gillis (74) *Attorney, Agent, or Firm* — Perkins Coie LLP (57) ABSTRACT

The present document relates to methods, systems, and devices related to digital wireless communication, and more specifically, to techniques related to determining whether to switch a carrier of control channel resources such as a physical uplink control channel (PUCCH) resource. One example method includes transmitting, by a network node, a carrier indicator message to a terminal, the carrier indicator message indicating a carrier via a predefined bit field in a control indicator field. The method can also include receiving, by the network node, a second message from the terminal on the carrier indicated in the carrier indicator message.

14 Claims, 5 Drawing Sheets

(56) References Cited

U.S. PATENT DOCUMENTS

| | | |
|---|---|---|
| 2020/0305186 A1 | 9/2020 | Alfarhan et al. |
| 2021/0235467 A1* | 7/2021 | Papasakellariou .... H04W 56/00 |
| 2022/0116938 A1* | 4/2022 | Huang ................. H04L 5/0053 |
| 2023/0055619 A1* | 2/2023 | Li ..................... H04W 72/1273 |

OTHER PUBLICATIONS

International Preliminary Report on Patentability issued in International Patent Application No. PCT/CN2020/121022, dated Apr. 13, 2023, 4 pages.
Office Action for Chinese Patent Application No. 202080106279.5 dated Feb. 22, 2025, 8 pages (English Translation).
Huawei et al., "Discussion on 2-step RACH procedure," 3GPP TSG RAN WG1 Meeting #98, Prague, Czech Republic, R1-1908034, Aug. 26-30, 2019. 14 pages.
ETSI TS 138 213, V16.2.0 (Jul. 2020), 5G; NR; Physical layer procedures for control, 3GPP TS 38.213, version 16.2.0 Release 16, France, Jul. 2020, 180 pages.
International Search Report and Written Opinion for PCT Application No. PCT/CN2020/121022, mail date: Jul. 15, 2021. 7 pages.
CNIPA: Office Action for Chinese Patent Application No. 202080106279.5 dated Jun. 13, 2025, 9 pages (English Translation.

\* cited by examiner

DETERMINING A CARRIER FOR A CONTROL CHANNEL TRANSMISSION

CROSS-REFERENCE TO RELATED APPLICATIONS

This application is a continuation of International Patent Application No. PCT/CN2020/121022, filed on Oct. 15, 2020, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to determining whether to switch a carrier of a control channel transmission from a terminal to a network node.

In one exemplary aspect, a method for wireless communication is disclosed. The method includes transmitting, by a network node, a carrier indicator message to a terminal, the carrier indicator message indicating a carrier via a predefined bit field in a control indicator field. The method can also include receiving, by the network node, a second message from the terminal on the carrier indicated in the carrier indicator message.

In another exemplary aspect, a method for wireless communication comprises receiving, by a terminal, a carrier indicator message from a network node, the carrier indicator message indicating a carrier via a predefined bit field in a control indicator field. The method can also include transmitting, by the terminal, a second message to the network node on the carrier indicated in the carrier indicator message.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the clauses.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR can provide greater throughput to allow more users connected at the same time. Other aspects, such as energy consumption, device complexity, spectral efficiency, and latency are also important to meeting the needs of various communication scenarios. In the current technology, if carrier aggregation is used for a terminal or a user equipment (UE), a corresponding physical uplink control channel carrying a hybrid automatic repeat request acknowledgement (HARQ-ACK PUCCH) may always be transmitted in the uplink primary carrier (Pcell).

Figure 1:
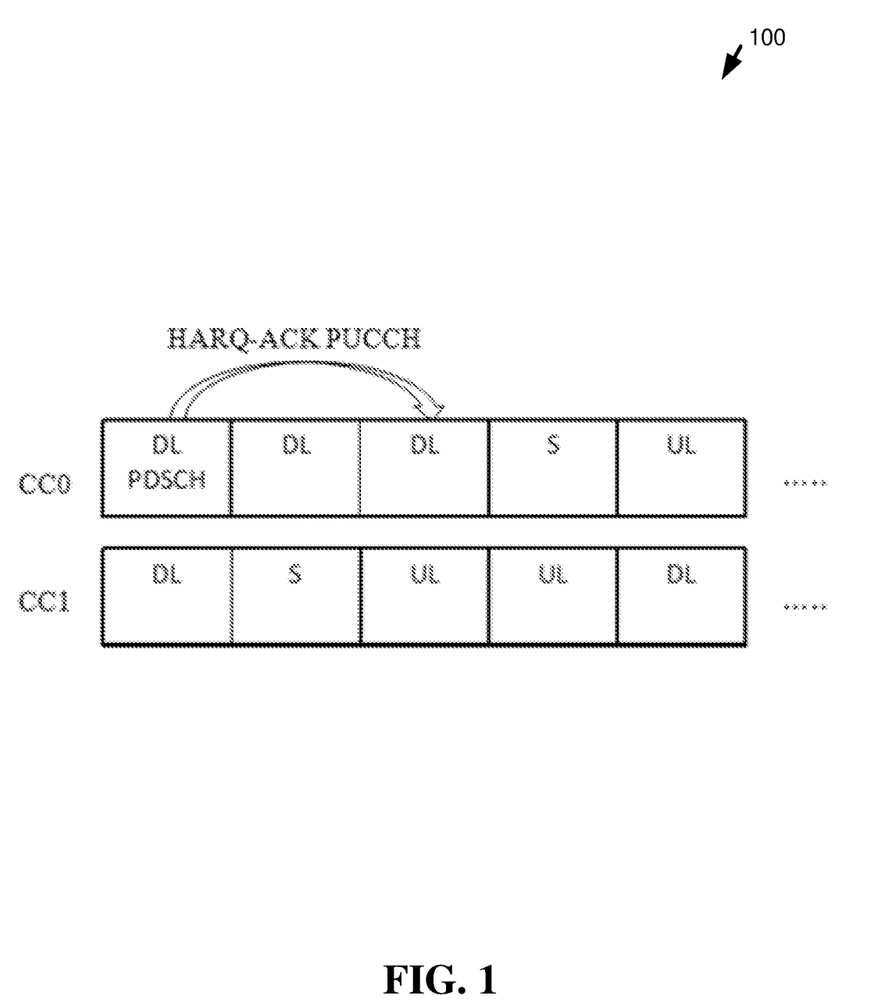
FIG. 1 is an example block diagram representing multiple carriers.

FIG. 1 is an example block diagram 100 representing multiple carriers. However, in some cases, for example, such as is shown in FIG. 1, CC0 and CC1 are aggregated, where CC0 is the primary carrier and CC1 is the secondary carrier. The slot configurations of CC0 and CC1 are shown in FIG. 1, where D indicates downlink slot, S indicates flexible slot and U indicates uplink slot. When the physical downlink shared channel (PDSCH) in the first downlink slot of the CC0 is scheduled and required to feed back HARQ-ACK in the third slot, but the third slot is a DL slot in the CC0, HARQ-ACK PUCCH may not be transmitted. However, the transmission of the ultra-reliable low-latency communication (URLLC) service may not be delayed.

Accordingly, the HARQ-ACK PUCCH can be modified/switched to the CC1 for transmission, because the HARQ-ACK PUCCH can correspond to a UL slot in the CC1. This method can also be used with other PUCCHs, such as CSI PUCCH and/or SR PUCCH.

Example Embodiment 1

In example embodiment 1, the gNodeB can indicate a carrier for PUCCH transmission for the UE through the predefined bit field in the DCI in the physical downlink control channel (PDCCH). Here, the PUCCH can include any of HARQ-ACK PUCCH, SR PUCCH, CSI PUCCH, negative acknowledgement (NACK) only PUCCH, ACK only PUCCH, and/or beam failure recovery (BFR) PUCCH.

Using HARQ-ACK PUCCH as an example, when the gNodeB schedules a PDSCH through the DCI in the PDCCH, the predefined bit field in the DCI can indicate a carrier to transmit the HARQ-ACK PUCCH corresponding to the PDSCH. In this way, after receiving the DCI, the UE can receive the PDSCH according to the scheduling information in the DCI, decode the PDSCH, and transmit the corresponding HARQ-ACK PUCCH in the carrier indicated by the DCI.

When a PDSCH is scheduled and a CSI PUCCH (for example, a A-CSI report) is triggered through the DCI in the PDCCH, the gNodeB can also be a carrier to transmit the CSI PUCCH through the pre-defined bit field in the DCI. In this way, after receiving the DCI, the UE can transmit the CSI PUCCH in the carrier indicated by the DCI.

When transmitting the Release DCI or dormancy DCI in the PDCCH, the gNodeB can instruct a carrier to transmit the HARQ-ACK PUCCH corresponding to the Release DCI or dormancy DCI through the predefined bit field in the Release DCI or dormancy DCI.

The predefined bit field may be a new bit field in the DCI, or an existing bit field in the DCI is re-interpreted as the predefined bit field. For example, the existing bit fields can include at least: from PDSCH to the corresponding HARQ-ACK feedback indication field (timing indicator, recorded as k1), used to describe the slot quantity between slot where the PDSCH is located and slot where the corresponding HARQ-ACK PUCCH is located. Alternatively, the field can include a PUCCH resource indication field (PUCCH resource indicator, recorded as PRI), used to describe a PUCCH resource from the PUCCH resource set.

To reduce the overhead of the predefined bit field in the DCI, the gNodeB can configure multiple carriers for the UE and allow the PUCCH switch/handover between the multiple carriers. For example, the gNodeB can configure multiple carriers through radio resource control (RRC) or medium access control (MAC) control element (MAC CE) signaling and instructs one carrier to transmit PUCCH from the multiple carriers through the predefined bit field in the DCI. The same subcarrier spacing (SCS) may be kept for multiple carriers to simplify the operation. In some instances, different SCSs can be allowed for multiple carriers.

In order to achieve low UE cost, a new signaling 1 can also be introduced to notify the gNodeB that the UE has/or does not have the capability to support the switch/handover of the carrier of PUCCH transmission. For example, new signaling 1 notifies gNodeB: The UE is capable of supporting the switch/handover of the carrier of PUCCH transmission. If the gNodeB receives this new signaling 1, it can instruct the UE to switch the carrier transmitted on the PUCCH. Otherwise, it cannot instruct the UE to switch the carrier of PUCCH transmission (meaning that the PUCCH is transmitted in Pcell). As another example, the new signaling 1 notifies gNodeB that the UE is not capable of supporting the switch/handover of the carrier the carrier of PUCCH transmission. If the gNodeB receives this new signaling 1, it cannot instruct the UE to switch the carrier of PUCCH transmission. Otherwise, it can instruct the UE to switch the carrier of PUCCH transmission.

In order to reduce the complexity of gNodeB scheduling, a new signaling 2 can be introduced to notify the UE that the gNodeB allows (or does not allow) the UE to switch the carrier of PUCCH transmission. For example, the new signaling 2 notifies the UE that the gNodeB allows the UE to switch the carrier of PUCCH transmission. If the UE receives this new signaling 2, it receives this DCI and determines a carrier for PUCCH transmission according to the predefined bit field in the DCI. Otherwise, after receiving the DCI, the UE ignores the predefined bit field in the DCI and does not determine the carrier for PUCCH transmission according to the predefined bit field (meaning that the PUCCH is transmitted in the Pcell). As another example, the new signaling 2 notifies the UE that the gNodeB does not allow the UE to switch the carrier of PUCCH transmission. If the UE receives this new signaling 2, after receiving the DCI, the UE ignores the predefined bit field in the DCI and does not determine the carrier for PUCCH transmission according to the predefined bit field (meaning that the PUCCH is transmitted in the Pcell). Otherwise, after receiving the DCI, UE determines a carrier for PUCCH transmission according to the predefined bit field in the DCI. The new signaling 2 can be configured to the UE by gNodeB via RRC or MAC CE signaling.

If the predefined bit field in the DCI is a new bit field, and if the predefined bit field exists in the DCI (that is, is configured in the DCI), it can indicate that the UE needs to determine the carrier to which PUCCH is transmitted according to the predefined bit field. If the predefined bit field does not exist (that is, is not configured in the DCI), the UE default PUCCH may be transmitted in the Pcell and may not switch the carrier of PUCCH transmission.

If the UE determines from the predefined bit field in the DCI that it needs to switch a PUCCH transmission to another carrier, a PUCCH power indication field (transmit power control (TPC)) command for scheduled PUCCH, also called TPC) in the DCI can be applicable to the power control for the PUCCH transmission in another carrier. In fact, all parameters related to PUCCH in the DCI can be applicable to PUCCH transmission in another carrier. For example, if a PUCCH is instructed to be transmitted in the CC1, the values of the parameters related to PUCCH in the DCI, such as k1, PRI, SCS and TPC, are determined from the k1 set, PUCCH resource set, SCS and TPC configured for the CC1.

As a further extension, for other fields in the existing DCI, such as the TPC field, BWP indication field (also called BWP) or SRS request field (SRS request), the high bits of these fields can be interpreted as the predefined bit field, or these fields are interpreted as the predefined bit field.

If multiple carriers are configured for a UE to switch the PUCCH transmission between these carriers, the bit size of PUCCH-related parameter fields (such as k1, PRI, TPC) in the DCI may be determined based on the configuration information of the carrier being from the multiple carriers and causing the largest bit size.

Example Embodiment 2

In some instances, the high bits of the existing k1 field in DCI are re-interpreted as predefined bit fields to indicate a carrier for PUCCH transmission. In the current specifications, the k1 field in the DCI can indicate the number of slot intervals between the slot of the PDSCH scheduled by the DCI and the slot of the corresponding HARQ-ACK PUCCH. In general, 3 bits are used for the k1 field, but in some cases, 0, 1 or 2 bits are used for the k1 field through RRC configuration.

As an example, the UE reports to the gNodeB: UE supports the switch/handover of the PUCCH transmission carrier, and the UE is configured to allow the switch/handover of the PUCCH transmission carrier. For example, UE is configured to allow switching the PUCCH transmission carrier between CC0 and CC1 through RRC signaling. Suppose the k1 field is configured as 3 bits. Here, CC0 is UL Pcell, and CC1 is UL Scell. The 1 bit of the high bit (the highest bit) of the k1 field in this DCI indicates a carrier for PUCCH transmission. For example, when the high bit of the k1 is 0, it means the PUCCH is transmitted in the CC0; when the high bit of the k1 is 1, it means the PUCCH is transmitted in the CC1 (or, for example, when the high bit of the k1 is 0, it means the PUCCH is transmitted in the Pcell; when the high bit of the k1 is 1, it means the PUCCH is transmitted in the Scell (or non-Pcell)). Combined with FIG. 1, through a DCI, gNodeB can schedule a PDSCH in the first slot of CC0. The gNodeB can set the high bit of the k1 field to 1, and the low bit of the k1 field (except for the predefined bit field) indicates that the HARQ-ACK PUCCH of this PDSCH is transmitted in the third slot. After receiving the DCI, the UE can identify that the HARQ-ACK PUCCH will be transmitted in the CC1, and determines that the HARQ-ACK PUCCH will be transmitted in the third slot of the CC1. In some instances, the number of slot intervals is determined according to the low bit value of the k1 field from the k1 set configured for the CC1.

Since only the low bits in the k1 field are used to indicate the number of slot intervals, that is, 2 bit, the number of k1 values in the k1 set can be configured in the following way: Case 1: (most) $2^3$ k1 values, case2: (most) $2^2$ k1 values. For the case1, gNodeB and UE agree in advance that the low bits of the k1 field correspond to (most) $2^2$ k1 values in the k1 set, for example, (most) first $2^2$ k1 values in the k1 set.

If the k1 field is configured as 2 bits, it can be similar to that the k1 field is configured as 3 bit. If the k1 field is configured as 1 bit and the UE is allowed to switch/hand over the PUCCH transmission carrier (or if the UE is configured with carriers to switch/hand over the PUCCH transmission), the 1 bit of the k1 field is used to indicate a carrier used for PUCCH transmission. The number of slot intervals uses a defined k1 value from the k1 set. The K1 set includes (maximum) $2^1$ k1 values.

If the k1 field is configured as 0 bit, it can indicate that the switch/handover of the PUCCH transmission carrier is not supported, that is, the PUCCH is transmitted in the UL Pcell. The K1 set can include (maximum) $2^0$ k1 values, and the number of slot intervals uses a default k1 value from k1 set. The above methods can be applicable to DCI 1-0, DCI 1-1 and DCI 1-2.

This can reduce the number of k1 values in the k1 set, but it may not increase the number of bits in DCI and will not introduce a new DCI format.

If multiple carriers are configured for a UE to switch the PUCCH transmission between these carriers, the bit size of PUCCH-related parameter fields (such as k1, PRI, TPC) in the DCI is determined based on the configuration information of the carrier being from the multiple carriers and causing the largest bit size.

Example Embodiment 3

The high bits of the existing PRI field in DCI may be re-interpreted as predefined bit fields to indicate a carrier for PUCCH transmission.

In the current specifications, the PRI field in the DCI can indicate a PUCCH resource from the PUCCH resource set. In general, 3 bits can be used for the PRI field, but in some cases, 0, 1 or 2 bits can be used for the PRI field through RRC configuration.

As an example, the UE reports to the gNodeB: UE supports the switch/handover of the PUCCH transmission carrier, and the UE is configured to allow the switch/handover of the PUCCH transmission carrier. For example, UE is configured to allow switching the PUCCH transmission carrier between CC0 and CC1 through RRC signaling. Suppose the PRI field is configured as 3 bit. Here, CC0 is UL Pcell, and CC1 is UL Scell. The 1 bit of the high bit (the highest bit) of the PRI field in this DCI indicates a carrier for PUCCH transmission. For example, when the high bit of the PRI is 0, it means the PUCCH is transmitted in the CC0; when the high bit of the PRI is 1, it means the PUCCH is transmitted in the CC1 (or, for example, when the high bit of the PRI is 0, it means the PUCCH is transmitted in the Pcell; when the high bit of the PRI is 1, it means the PUCCH is transmitted in the Scell (or non-Pcell)). Combined with FIG. 1, through a DCI, gNodeB can schedule a PDSCH in the first slot of CC0. The gNodeB can set the high bit of the PRI field to 1, and the low bit of the PRI field (except for the predefined bit field) indicates that the HARQ-ACK PUCCH of this PDSCH is transmitted in the third slot. After receiving the DCI, the UE can identify that the HARQ-ACK PUCCH will be transmitted in the CC1, and determines that the HARQ-ACK PUCCH will be transmitted in the third slot of the CC1. In some instances, the PUCCH resource is determined according to the low bit value of the PRI field from the PUCCH resource set configured for the CC1.

Since only the low bits in the PRI field are used to indicate a PUCCH resource from the PUCCH resource set, that is, 2 bits, the number of PUCCH resources in the PUCCH resource set can be configured in the following way: Case 1: (most) $2^3$ PUCCH resources, case2: (most) $2^2$ PUCCH resources. For the case1, gNodeB and UE agree in advance that the low bits of the PRI field correspond to (most) $2^2$ PUCCH resources in the PUCCH resource set, for example, (most) first $2^2$ PUCCH resource in the PUCCH resource set.

If the PRI field is configured as 2 bit, it can be similar to that the PRI field is configured as 3 bit. If the PRI field is configured as 1 bit and the UE is allowed to switch/hand over the PUCCH transmission carrier (or if the UE is configured with carriers to switch/hand over the PUCCH transmission), the 1 bit of the PRI field can be used to indicate a carrier for PUCCH transmission. The PUCCH resource uses a defined PUCCH resource from the PUCCH resource set. The PUCCH resource set can include (maximum) $2^1$ PUCCH resources.

If the PRI field is configured as 0 bit, it can indicate that the switch/handover of the PUCCH transmission carrier is not supported, that is, the PUCCH can be transmitted in the UL Pcell. The PUCCH resource set can include (maximum) $2^0$ PUCCH resources, and the PUCCH resource uses a default PUCCH resource from the PUCCH resource set.

The above methods can be applicable to DCI 1-0, DCI 1-1 and DCI 1-2. This mechanism can reduce the number of PUCCH resource in the PUCCH resource set, but it may not increase the number of bits in DCI and will not introduce a new DCI format.

If multiple carriers are configured for a UE to switch the PUCCH transmission between these carriers, the bit size of PUCCH-related parameter fields (such as k1, PRI, TPC) in the DCI is determined based on the configuration information of the carrier being from the multiple carriers and causing the largest bit size.

Example Embodiment 4

Based on Example Embodiment 1-3, the methods in Embodiment 4 can be given to indicate a carrier for PUCCH transmission. The Demodulation Reference Signal (DMRS) sequence of the PDSCH can be used to instruct a carrier for PUCCH transmission. For example, the gNodeB configures multiple candidate DMRS sequences for PDSCH transmission. For example, two DMRS sequences are configured and recorded as sequence 1 and sequence 2 respectively. While transmitting the PDSCH, the gNodeB can transmit a DMRS sequence to instruct a carrier to transmit the HARQ-ACK PUCCH of the PDSCH.

For example, see FIG. 1. Assuming that DMRS sequence 1 corresponds to CC0 for PUCCH transmission, and DMRS sequence 2 corresponds to CC1 for PUCCH transmission. When the gNodeB transmits a PDSCH in the first slot of the CC0, the gNodeB may want the HARQ-ACK PUCCH of the PDSCH to be transmitted in the CC1. The gNodeB can transmit DMRS sequence 2 for decoding the PDSCH. When receiving the PDSCH, the UE can detect the corresponding DMRS sequence. The UE can discover that DMRS sequence 2 is transmitted, and then the UE considers that the HARQ-ACK PUCCH of the PDSCH will be transmitted in the CC1.

This mechanism may not cause signaling overhead but can increase the complexity of DMRS sequence detection. In many cases, for a UE, a PUCCH resource set is configured with per BWP (Bandwidth part), that is, all PUCCH resources in a PUCCH resource set come from a BWP of a carrier. The following describes a new method to construct a PUCCH resource set. With this new PUCCH resource set, the existing PUCCH resource indication can be used to dynamically switch or hand over the PUCCH transmission carrier.

The present embodiments can include PUCCH resource set configured containing PUCCH resources from different carriers (or BWPs) for the UE. Then, the PRI (PUCCH resource indicator) in DCI in the PDCCH can be used to indicate the index of PUCCH resources from the PUCCH resource set. As agreed by the gNodeB and the UE, the carrier where the indicated PUCCH resources are located is the PUCCH transmission carrier (or BWP). In this way, the UE can indirectly obtain the PUCCH transmission carrier (or BWP) from the PRI. The following uses a carrier as an example.

On the gNodeB side, the gNodeB configures with one or more PUCCH resource sets for UEs. The PUCCH resource set can include N PUCCH resources, some of which come from Carrier 0 (CC0), and the others from Carrier 1 (CC1). In this way, gNodeB instructs a PUCCH resource through the PRI in DCI. If the PUCCH resource indicated by the PRI comes from CC0, it can indicate that the PUCCH is required to be transmitted in CC0. If the PUCCH resource indicated by the PRI comes from CC1, it means that the PUCCH is required to be transmitted in CC1.

On the UE side, a PUCCH resource set containing PUCCH resources from different carriers (or BWPs) be configured for the UE. The UE receives the DCI in the PDCCH, and obtains a PUCCH resource from the PRI in the DCI, and determines that the carrier (or BWP) where the PUCCH resource is located is a PUCCH transmission carrier (or BWP).

For example, gNodeB configures one or more PUCCH resource sets for the UE, which contain the PUCCH resources from multiple carriers. For example, a PUCCH resource set contains PUCCH resources from CC0 and CC1. According to the existing technology, gNodeB can configure eight PUCCH resources for the UE in CC0, with the ID as 0~7. In CC1, it also configures eight PUCCH resources for the UE, with the ID as 0~7. The gNodeB can configure PUCCH resources identified as 0~3 in CC0 and PUCCH resources identified as 0~3 in CC1 into a PUCCH resource set. In this way, a PUCCH resource set containing PUCCH resources from multiple carriers can be constructed for a UE. Thus, the PUCCH resource set can include eight PUCCH resources, which come from CC0 and CC1 respectively. In this PUCCH resource set, the eight PUCCH resources are configured with indexes. For example, the PUCCH resources identified as 0~3 from CC0 are sequentially indexed as 0~3, and the PUCCH resources identified as 0~3 from CC1 are sequentially indexed as 4~7. Thus, in this PUCCH resource set, each PUCCH resource can have a unique index.

The gNodeB can instruct a PUCCH resource from the PUCCH resource set for the UE through the PRI in the DCI in the PDCCH. If the gNodeB wants the UE to transmit a PUCCH resource through CC0, it can set the PRI value to 0~3 (e.g., setting PRI=1), so that the PUCCH resource with index 1 in the PUCCH resource set is required to be transmitted through CC0 (because the PUCCH resource with index 1 is in CC0). Similarly, if the gNodeB wants the UE to transmit a PUCCH resource through CC1, it can set the PRI value to 4~7 (e.g., setting PRI=4). Thus, the PUCCH resource with index 4 in the PUCCH resource set is required to be transmitted through the CC1 (because the PUCCH resource with index 4 is in the CC1).

On the UE side, a PUCCH resource set containing PUCCH resources from multiple carriers can be configured for the UE. Each PUCCH resource is configured with a unique index in the PUCCH resource set. Then, the UE receives the DCI in the PDCCH and obtains a PUCCH resource from the PRI in the DCI. In this way, the UE can determine that the carrier where the PUCCH resource is located is the PUCCH transmission carrier.

In this way, it can dynamically instruct a carrier for each PUCCH transmission to solve the problems raised in the background technology. It may only need to define that the PUCCH resources in the PUCCH resource set come from multiple carriers. Then, the PRI in the DCI can indicate a PUCCH resource from PUCCH resource set, and indirectly indicates a carrier for the PUCCH transmission.

The gNodeB can configure multiple carriers for switching the PUCCH transmission carrier through RRC or MAC CE for UE. The same subcarrier spacing (SCS) can be kept for the multiple carriers to simplify the operation (different SCSs are also feasible).

A PUCCH resource set that contains PUCCH resources from multiple carriers can at least contain PUCCH resources in the UL Pcell. If the UE is configured with this PUCCH resource set, but the PRI field in DCI is configured with 0 bit, then gNodeB and the UE can consider that the PUCCH resource will be determined from UL Pcell and transmitted in UL Pcell. PUCCH includes HARQ-ACK PUCCH, SR PUCCH, CSI PUCCH, NACK only PUCCH, ACK only PUCCH and BFR PUCCH.

In order to achieve low UE cost, a new signaling 1 can also be introduced to notify the gNodeB that the UE has/or does not have the capability to support the switch/handover of the carrier of PUCCH transmission. Multiple descriptions can be given here. For example, new signaling 1 notifies gNodeB: The UE is capable of supporting the switch/handover of the carrier of PUCCH transmission. If the gNodeB receives this new signaling 1, it can instruct the UE to switch the carrier transmitted on the PUCCH. Otherwise, it cannot instruct the UE to switch the carrier of PUCCH transmission (meaning that the PUCCH is transmitted in Pcell). Or for example, the new signaling 1 notifies gNodeB that the UE is not capable of supporting the switch/handover of the carrier the carrier of PUCCH transmission. If the gNodeB receives this new signaling 1, it cannot instruct the UE to switch the carrier of PUCCH transmission. Otherwise, it can instruct the UE to switch the carrier of PUCCH transmission.

In order to reduce the complexity of gNodeB scheduling, a new signaling 2 can be introduced to notify the UE that the gNodeB allows (or does not allow) the UE to switch the carrier of PUCCH transmission.

If the PRI in a DCI indicates that the PUCCH is required to be transmitted in the CC1, all the parameters related to the PUCCH in the DCI can be applicable to carrier 1. For example, the actual value of the parameters related to the PUCCH is determined according to the parameters in carrier 1. For example, if the PUCCH is indicated to be transmitted in carrier 1, the k1, PRI, subcarrier spacing (SCS) and transmission power control TPC in the DCI correspond to the configurations in CC1.

Example Embodiment 5

Example Embodiment 5 can be given to indicate a carrier for PUCCH transmission. The DMRS sequence of the PDSCH can be used to instruct a carrier for PUCCH transmission. For example, the gNodeB configures multiple candidate DMRS sequences for PDSCH transmission. For example, two DMRS sequences are configured and recorded as sequence 1 and sequence 2 respectively. While transmitting the PDSCH, the gNodeB can transmit a DMRS sequence to instruct a carrier to transmit the HARQ-ACK PUCCH of the PDSCH.

For example, see FIG. 1. Assume that DMRS sequence 1 corresponds to CC0 for PUCCH transmission, and DMRS sequence 2 corresponds to CC1 for PUCCH transmission. When the gNodeB transmits a PDSCH in the first slot of the CC0, the gNodeB wants the HARQ-ACK PUCCH of the PDSCH to be transmitted in the CC1. Then the gNodeB can transmit DMRS sequence 2 for decoding the PDSCH. When receiving the PDSCH, the UE detects the corresponding DMRS sequence. The UE discovers that DMRS sequence 2 is transmitted, and then the UE considers that the HARQ-ACK PUCCH of the PDSCH will be transmitted in the CC1. This mechanism may not cause signaling overhead but increases the complexity of DMRS sequence detection.

Example Embodiment 6

In many cases, the earliest transmission position allowed for the HARQ-ACK PUCCH corresponding to a PDSCH is defined through $T_{proc,1}$. Here, the definition of $T_{proc,1}$ can take into account the SCS of the PDCCH, the SCS of the PDSCH and the SCS of the PUCCH. Therefore, an SCS can be selected that maximizes the $T_{proc,1}$, and then determine the corresponding parameters (e.g., the value of N1) according to the SCS to calculate the $T_{proc,1}$.

Considering that the dynamic switch/handover of the PUCCH transmission carrier may affect the earliest position of the PUCCH transmission, the following describes how to define the switch/handover duration of the PUCCH transmission carrier to better determine the earliest position of the PUCCH transmission.

To simplify the description, it is assumed that the duration required for the UE to complete the PUCCH transmission carrier handover (including the corresponding preparations) is recorded as S1. The S1 can be defined by the number of symbols, the number of slots, absolute time or number of sampling points. If S1 duration is defined by the number of symbols, the number of different symbols is defined as S1 duration in the case of subcarrier spacing (SCS) of each type. The starting point of the S1 duration is defined to the end of the last symbol of the PDCCH used for changing the PUCCH transmission carrier. Then, the duration is S1. The PUCCH transmission switched to another carrier should not be earlier than the end of the S1. Of course, the $T_{proc,1}$ defined by the existing specifications should also be satisfied. That is, if the carrier of a PUCCH transmission is switched/changed, the first symbol of the PUCCH transmission should not be earlier than the end of $T_{proc,1}$ or S1.

Figure 2:
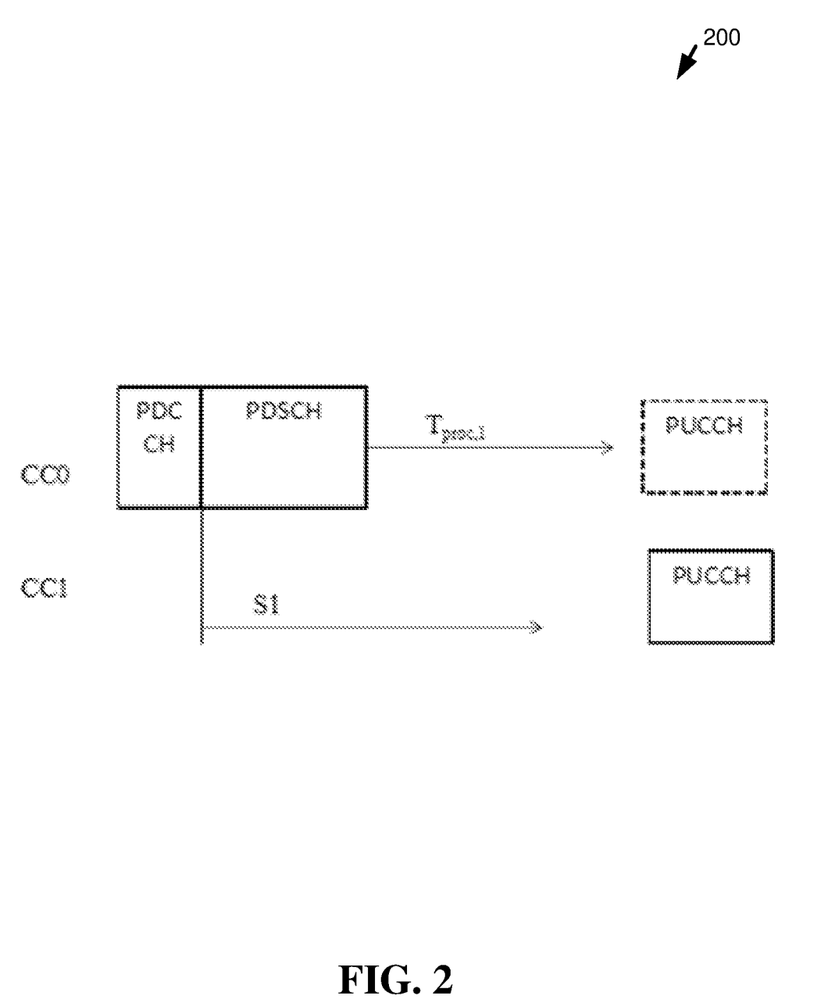
FIG. 2 is an example block diagram for a carrier for a physical uplink control channel (PUCCH) transmission switching.

An example is shown in FIG. 2. FIG. 2 is an example block diagram 200 of a carrier for PUCCH transmission switching. One PDCCH schedules one PDSCH and indicates the position of the HARQ-ACK PUCCH of the PDSCH. The start position of $T_{proc,1}$ is the end of the PDSCH scheduled by the PDCCH, and the start position of S1 is the end of the PDCCH. The PRI in DCI in the PDCCH indicates that a PUCCH is handed over from CC0 to CC1. Then, the first symbol of the PUCCH should not be earlier than the end of $T_{proc,1}$ and S1.

The time length of S1 can be obtained through actual test, or a looser S1 can be defined. Table 1 defines a possible S1 duration.

TABLE 1

| SCS | NR Slot length (ms) | S1 duration(slot) | |
|---|---|---|---|
| | | Type 1[Note 1] | Type 2[Note 1] |
| 15 KHz | 1 | 1 | 3 |
| 30 KHz | 0.5 | 2 | 5 |
| 60 KHz | 0.25 | 3 | 9 |
| 120 KHz | 0.125 | 6 | 18 |

Note 1
Depends on UE capability.
Note 2:
If the PUCCH transmission carrier switch involves changing of SCS, the S1 is determined by the smaller SCS between the SCS before PUCCH transmission carrier switch and the SCS after PUCCH transmission carrier switch.

Figure 3:
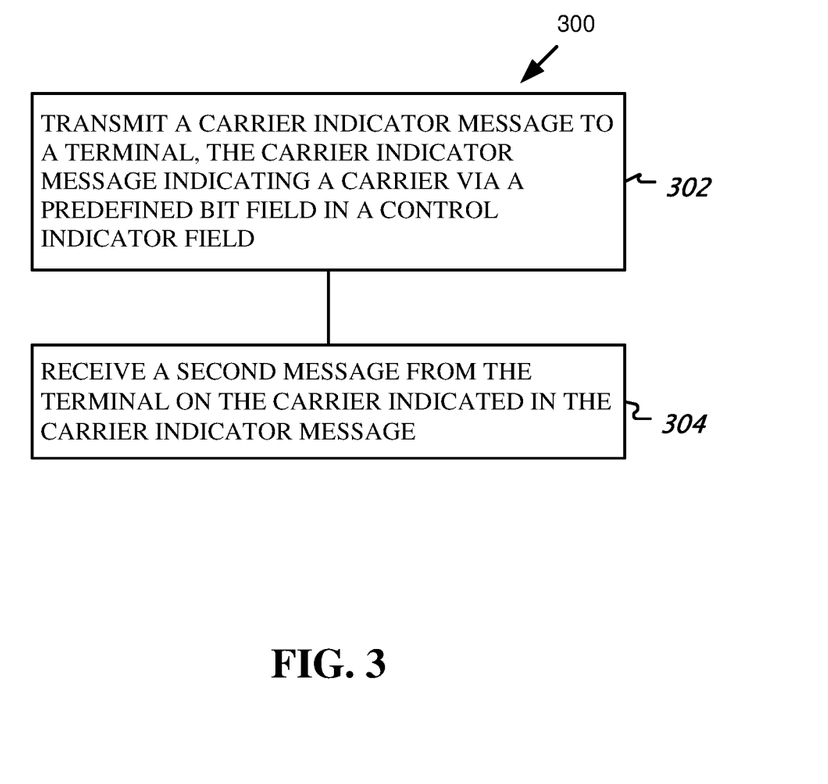
FIG. 3 is a block diagram of an example method for determining whether to switch a carrier of PUCCH resources.

FIG. 3 is a block diagram of an example method 300 for determining whether to switch a carrier of PUCCH resources. The method can include transmitting, by a network node, a carrier indicator message to a terminal, the carrier indicator message indicating a carrier via a predefined bit field in a control indicator field (block 302). A carrier can include transmission resources, such as CC0 or CC1 as described with respect to FIG. 1. The control indicator field can include a DCI.

The method can also include receiving, by the network node, a second message from the terminal on the carrier indicated in the carrier indicator message (block 304). The second message can include an uplink message (PUCCH message) sent from a UE to a gNB, as is described in FIG. 2.

In some embodiments, the carrier indicator message is transmitted in a physical downlink control channel (PDCCH) message and the second message is transmitted in a physical uplink control channel (PUCCH) message.

In some embodiments, the control indicator field includes a downlink control information (DCI) field.

In some embodiments, the second message includes any of a hybrid automatic repeat request (HARD) acknowledgement (ACK) PUCCH (HARQ-ACK PUCCH) message, a scheduling request (SR) PUCCH message, a channel state information (CSI) PUCCH message, a negative acknowledgement (NACK) only PUCCH message, an ACK only PUCCH message, and a beam failure recovery (BFR) PUCCH message.

In some embodiments, the carrier indicator message indicates the carrier to transmit a HARQ-ACK PUCCH message corresponding to a physical downlink shared channel (PDSCH) message.

In some embodiments, the terminal is configured to receive a PDSCH according to scheduling information included in a DCI of the carrier indication message, and wherein the terminal is configured to transmit a HARQ-ACK PUCCH in the carrier indicated by the DCI of the carrier indication message.

In some embodiments, the carrier indicator message includes the carrier to transmit a CSI PUCCH via the predefined bit field in a DCI of the carrier indication message when a PDSCH message is scheduled by the DCI of the carrier indication message and the CSI PUCCH is triggered through the DCI of the carrier indication message in a PDCCH message.

In some embodiments, the carrier indicator message indicates the carrier to transmit a HARQ-ACK PUCCH corresponding to a release DCI or a dormancy DCI in the predefined bit field included in the release DCI or the dormancy DCI.

In some embodiments, the carrier indicator message indicates a carrier from multiple carriers configured for the terminal to allow for a PUCCH switch between the multiple carriers.

In some embodiments, the method includes receiving, by the network node, a first signaling message from the terminal indicating that the terminal is capable of performing a switch of the carrier for a PUCCH transmission, wherein the network node is allowed to instruct the terminal to switch the carrier in the carrier indicator message responsive to receiving the first signaling message.

In some embodiments, the method includes transmitting, by the network node, a second signaling message to the terminal indicating that the network node allows the terminal to switch the carrier for a PUCCH transmission, wherein terminal is configured to determine the carrier for the PUCCH transmission using the carrier indicator message.

In some embodiments, when multiple carriers are configured for the terminal to switch a PUCCH transmission, a bit size of a PUCCH-related parameter field in the control indicator field is determined based on a configuration information of one carrier being from the multiple carriers and resulting in a maximum bit size.

In some embodiments, a set of high bits of a k1 field of a DCI are interpreted as the predefined bit field to indicate the carrier for a PUCCH transmission.

In some embodiments, the network node is configured to schedule a physical downlink shared channel (PDSCH) in a first slot, where a high bit of the k1 field is set to 1, and wherein a low bit of the k1 field indicating that a HARQ-ACK PUCCH of the PDSCH is sent in a third slot.

In some embodiments, a k1 field of a DCI indicates the carrier used for a PUCCH transmission corresponding to that the k1 field of the DCI is configured as 1 bit.

In some embodiments, a k1 field of a DCI indicates that a switch of a PUCCH transmission carrier is not supported corresponding to that the k1 field of DCI is configured as 0 bit.

In some embodiments, a set of high bits of a PRI field in a DCI are re-interpreted as predefined bit field to indicate the carrier for a PUCCH transmission.

In some embodiments, the network node is configured to allow the terminal to switch the carrier between multiple carriers via radio resource control (RRC) signaling.

In some embodiments, a PRI field of the DCI indicates the carrier used for a PUCCH transmission corresponding to that the PRI field of the DCI is configured as 1 bit.

In some embodiments, a PRI field of the DCI indicates that a switch of a PUCCH transmission carrier is not supported corresponding to that the PRI field of DCI is configured as 0 bits.

In some embodiments, a PUCCH resource set is configured including PUCCH resources from multiple carriers or bandwidth parts (BWPs) for the terminal.

In some embodiments, the carrier indicator message is the PRI field in a DCI and indicates a PUCCH resource from the PUCCH resource set including PUCCH resources from multiple carriers or BWPs for the terminal.

In some embodiments, a PRI field in a DCI of the carrier indicator message indicates an index of PUCCH resources from the PUCCH resource set.

In some embodiments, the terminal is configured to determine that a carrier or BWP where a PUCCH resource indicated by the PRI is located is a PUCCH transmission carrier based on the PUCCH resource set.

In another example embodiment, a method for wireless communication comprises receiving, by a terminal, a carrier indicator message from a network node, the carrier indicator message indicating a carrier via a predefined bit field in a control indicator field. The method can also include transmitting, by the terminal, a second message to the network node on the carrier indicated in the carrier indicator message.

In some embodiments, the carrier indicator message is transmitted in a physical downlink control channel (PDCCH) message and the second message is transmitted in a physical uplink control channel (PUCCH) message.

In some embodiments, the control indicator field includes a downlink control information (DCI) field.

In some embodiments, the second message includes any of a hybrid automatic repeat request (HARD) acknowledgement (ACK) PUCCH (HARQ-ACK PUCCH) message, a scheduling request (SR) PUCCH message, a channel state information (CSI) PUCCH message, a negative acknowledgement (NACK) only PUCCH message, an ACK only PUCCH message, and a beam failure recovery (BFR) PUCCH message.

In some embodiments, the carrier indicator message indicates the carrier to transmit a HARQ-ACK PUCCH message corresponding to a physical downlink shared channel (PDSCH) message.

In some embodiments, the terminal is configured to receive a PDSCH according to scheduling information included in a DCI of the carrier indication message, and wherein the terminal is configured to transmit a HARQ-ACK PUCCH in the carrier indicated by the DCI of the carrier indication message.

In some embodiments, the carrier indicator message includes the carrier to transmit a CSI PUCCH via the predefined bit field in a DCI of the carrier indication message when a PDSCH message is scheduled by the DCI of the carrier indication message and the CSI PUCCH is triggered through the DCI of the carrier indication message in a PDCCH message.

In some embodiments, the carrier indicator message indicates the carrier to transmit a HARQ-ACK PUCCH corresponding to a release DCI or a dormancy DCI in the predefined bit field included in the release DCI or the dormancy DCI.

In some embodiments, the carrier indicator message indicates a carrier from multiple carriers configured for the terminal to allow for a PUCCH switch between the multiple carriers.

In some embodiments, the method includes receiving, by the network node, a first signaling message from the terminal indicating that the terminal is capable of performing a switch of the carrier for a PUCCH transmission, wherein the network node is allowed to instruct the terminal to switch the carrier in the carrier indicator message responsive to receiving the first signaling message.

In some embodiments, the method includes transmitting, by the network node, a second signaling message to the terminal indicating that the network node allows the terminal to switch the carrier for a PUCCH transmission, wherein terminal is configured to determine the carrier for the PUCCH transmission using the carrier indicator message.

In some embodiments, when multiple carriers are configured for the terminal to switch a PUCCH transmission, a bit size of a PUCCH-related parameter field in the control indicator field is determined based on a configuration information of one carrier being from the multiple carriers and resulting in a maximum bit size.

In some embodiments, a set of high bits of a k1 field of a DCI are interpreted as the predefined bit field to indicate the carrier for a PUCCH transmission.

In some embodiments, a k1 field of a DCI indicates the carrier used for a PUCCH transmission corresponding to that the k1 field of the DCI is configured as 1 bit.

In some embodiments, a k1 field of a DCI indicates that a switch of a PUCCH transmission carrier is not supported corresponding to that the k1 field of DCI is configured as 0 bit.

In some embodiments, a set of high bits of a PRI field in a DCI are re-interpreted as predefined bit field to indicate the carrier for a PUCCH transmission.

In some embodiments, the network node is configured to allow the terminal to switch the carrier between multiple carriers via radio resource control (RRC) signaling.

In some embodiments, a PRI field of the DCI indicates the carrier used for a PUCCH transmission corresponding to that the PRI field of the DCI is configured as 1 bit.

In some embodiments, a PRI field of the DCI indicates that a switch of a PUCCH transmission carrier is not supported corresponding to that the PRI field of DCI is configured as 0 bits.

In some embodiments, a PUCCH resource set is configured including PUCCH resources from multiple carriers or bandwidth parts (BWPs) for the terminal.

In some embodiments, the carrier indicator message is the PRI field in a DCI and indicates a PUCCH resource from the PUCCH resource set including PUCCH resources from multiple carriers or BWPs for the terminal.

In some embodiments, a PRI field in a DCI of the carrier indicator message indicates an index of PUCCH resources from the PUCCH resource set.

In some embodiments, the terminal is configured to determine that a carrier or BWP where a PUCCH resource indicated by the PRI is located is a PUCCH transmission carrier based on the PUCCH resource set.

Example Wireless System

Figure 4:
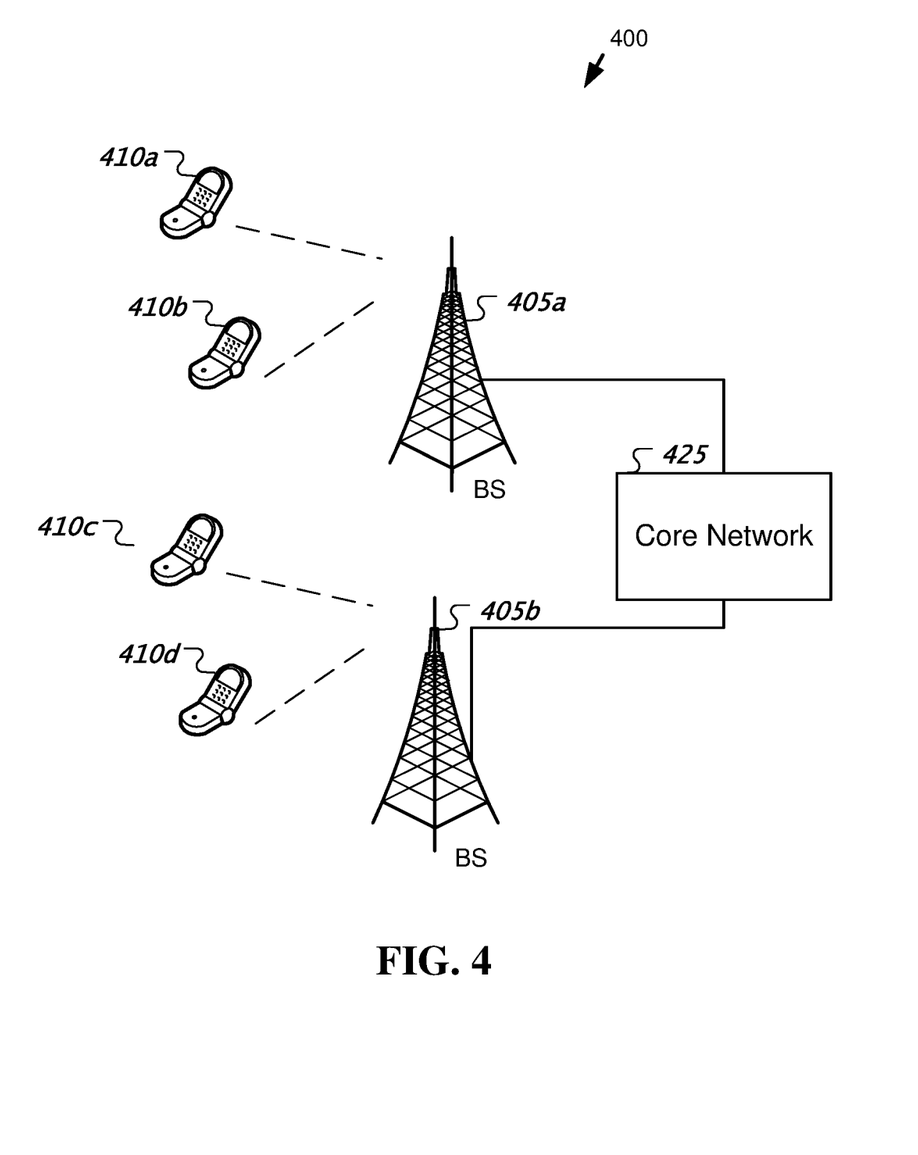
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405a, 405b, one or more wireless devices or terminals 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors. The base station may implement functionalities of a scheduling cell or a candidate cell, as described in the present document.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
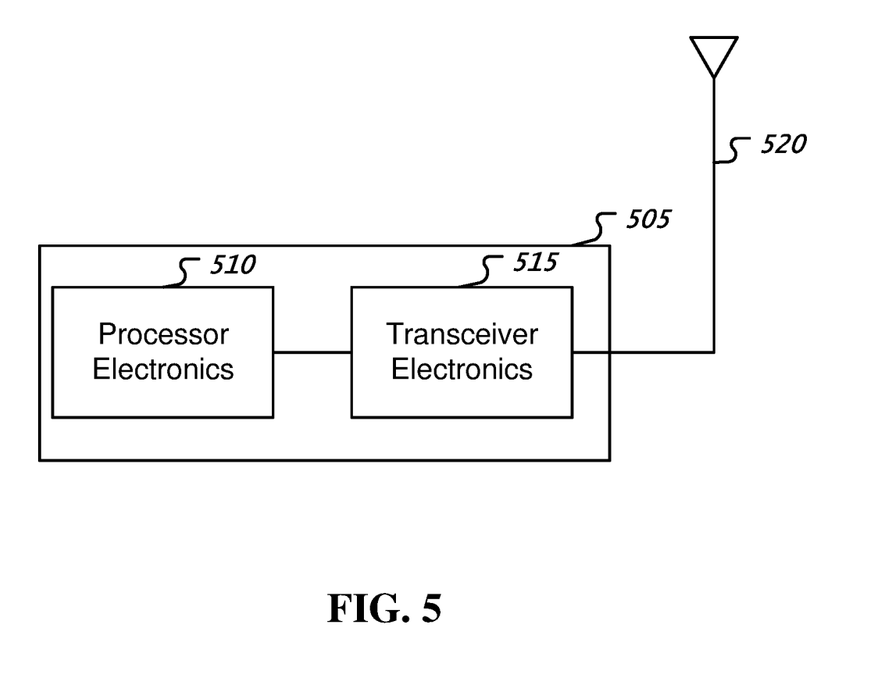
FIG. 5 is a block diagram representation of a portion of a hardware platform.

FIG. 5 is a block diagram representation of a portion of a hardware platform. A hardware platform 505 such as a network node or a base station or a terminal or a wireless device (or UE) can include processor electronics 510 such as a microprocessor that implements one or more of the techniques presented in this document. The hardware platform 505 can include transceiver electronics 515 to send and/or receive wired or wireless signals over one or more communication interfaces such as antenna 520 or a wireline interface. The hardware platform 505 can implement other communication interfaces with defined protocols for transmitting and receiving data. The hardware platform 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the hardware platform 505.

CONCLUSION

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication comprising:
transmitting, by a network node, a carrier indicator message in a physical downlink control channel (PDCCH) to a terminal, the carrier indicator message indicating a carrier via a predefined bit field in a downlink control information (DCI); and
receiving, by the network node, a second message in a physical uplink control channel (PUCCH) from the terminal on the carrier indicated in the carrier indicator message,
wherein a value of a parameter associated with the PUCCH is determined based on a corresponding parameter or parameter set configured for the carrier indicated by the carrier indicator message,
wherein the parameter includes at least one of: k1, a PUCCH resource indicator (PRI), a transmit power control for the PUCCH (TPC), or a subcarrier spacing (SCS), where k1 is a quantity of slots between a slot where a physical downlink shared channel (PDSCH) is located and a slot where a HARQ-ACK PUCCH corresponding the PDSCH is located.

2. The method of claim 1, wherein the second message includes at least one of: a hybrid automatic repeat request (HARQ) acknowledgement (ACK) (HARQ-ACK) message, a negative acknowledgement (NACK) only message, or an ACK only message.

3. The method of claim 1, wherein the predefined bit field is included in a release DCI, a dormancy DCI, or a DCI that schedules a physical downlink shared channel (PDSCH), and wherein the carrier indicator message indicates the carrier which is used to transmit a HARQ-ACK PUCCH corresponding to the release DCI, the dormancy DCI, or the PDSCH.

4. The method of claim 1, further comprising:
receiving, by the network node, a first signaling message from the terminal indicating that the terminal is capable of switching the carrier for a PUCCH transmission.

5. The method of claim 1, further comprising:
transmitting, by the network node via radio resource control (RRC) signaling, a second signaling message to the terminal indicating that the terminal is allowed switching the carrier for a PUCCH transmission between multiple carriers based on the carrier indicator message.

6. The method of claim 1, wherein in response to multiple carriers being configured for the terminal to switch a PUCCH transmission, a bit size of a PUCCH-related parameter field in the DCI is determined based on a configuration information of one carrier, wherein the one carrier is from the multiple carriers and results in a maximum bit size for the PUCCH-related parameter field, and wherein the configuration information includes PUCCH-related parameter associated with the PUCCH-related parameter field.

7. A method for wireless communication comprising:
receiving, by a terminal, a carrier indicator message in a physical downlink control channel (PDCCH) from a network node, the carrier indicator message indicating a carrier via a predefined bit field in a downlink control information (DCI);
transmitting, by the terminal, a second message in a physical uplink control channel (PUCCH) to the network node on the carrier indicated in the carrier indicator message; and
determining a value of associated with the PUCCH based on a corresponding parameter or parameter set configured for the carrier indicated by the carrier indicator message,
wherein the parameter includes at least one of: k1, a PUCCH resource indicator (PRD), a transmit power control for the PUCCH (TPC), or a subcarrier spacing (SCS), where k1 is a quantity of slots between a physical downlink shared channel (PDSCH) is located and a slot where a HARQ-ACK PUCCH corresponding the PDSCH is located.

8. The method of claim 7, wherein the second message includes at least one of: a hybrid automatic repeat request (HARQ) acknowledgement (ACK) (HARQ-ACK) message, a negative acknowledgement (NACK) only message, or an ACK only message.

9. The method of claim 7, wherein the predefined bit field is included in a release DCI, a dormancy DCI, or a DCI that schedules a physical downlink shared channel (PDSCH), and wherein the carrier indicator message indicates the carrier which is used to transmit a HARQ-ACK PUCCH corresponding to the release DCI, the dormancy DCI, or the PDSCH.

10. The method of claim 7, further comprising:
transmitting, by the terminal, a first signaling message to the network node indicating that the terminal is capable of switching the carrier for a PUCCH transmission.

11. The method of claim 7, further comprising:
receiving, by the terminal via radio resource control (RRC) signaling, a second signaling message from the network node indicating that the terminal is allowed to switch the carrier for a PUCCH transmission among multiple carriers based on the carrier indicator message.

12. The method of claim 7, wherein in response to multiple carriers being configured for the terminal to switch a PUCCH transmission, a bit size of a PUCCH-related parameter field in the DCI is determined based on a configuration information of one carrier, wherein the one carrier is from the multiple carriers and results in a maximum bit size for the PUCCH-related parameter field, and wherein the configuration information includes PUCCH-related parameter associated with the PUCCH-related parameter field.

13. An apparatus for wireless communication comprising one or more processors and a memory storing instructions, execution of which by the one or more processors causes the apparatus to:
transmit a carrier indicator message in a physical downlink control channel (PDCCH) message to a terminal, the carrier indicator message indicating a carrier via a predefined bit field in a downlink control information (DCI); and
receive a second message in a physical uplink control channel (PUCCH) message from the terminal on the carrier indicated in the carrier indicator message,
wherein a value of a parameter associated with the PUCCH is determined based on a corresponding parameter or parameter set configured for the carrier indicated by the carrier indicator message,
wherein the parameter includes at least one of: k1, a PUCCH resource indicator (PRI), a transmit power control for the PUCCH (TPC), or a subcarrier spacing (SCS), where k1 is a quantity of slots between a slot where a physical downlink shared channel (PDSCH) is located and a slot where a HARQ-ACK PUCCH corresponding the PDSCH is located.

14. An apparatus for wireless communication comprising one of more processors and a memory storing instructions, execution of which by the one or more processors causes the apparatus to:
receive a carrier indicator message in a physical downlink control channel (PDCCH) message from a network node, the carrier indicator message indicating a carrier via a predefined bit field in a downlink control information (DCI);
transmit a second message in a physical uplink control channel (PUCCH) message to the network node on the carrier indicated in the carrier indicator message, and
determine a value of a parameter associated with the PUCCH based on a corresponding parameter or parameter set configured for the carrier indicated by the carrier indicator message,
wherein the met lodes at least one of k1, PUCCH resource indicator (PR), a transmit power control for e PUCCH (TPC), or a subcarrier spacing (SCS), where k1 is a quantity of slots between a slot where a physical downlink shared channel (PDSCH) is located and a slot where a HARQ-ACK PUCCH corresponding the PDSCH is located.

* * * * *